us011539802B2

(12) United States Patent
Wu et al.

(10) Patent No.: US 11,539,802 B2
(45) Date of Patent: Dec. 27, 2022

(54) DYNAMICALLY CONFIGURABLE CLIENT APPLICATION ACTIVITY

(71) Applicant: Google LLC, Mountain View, CA (US)

(72) Inventors: Xiao Wu, Saratoga, CA (US); Edward Wu, San Carlos, CA (US); Moshe Albert Klebanov, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/459,628

(22) Filed: Aug. 27, 2021

(65) Prior Publication Data

US 2021/0392203 A1 Dec. 16, 2021

Related U.S. Application Data

(63) Continuation of application No. 16/564,298, filed on Sep. 9, 2019, now Pat. No. 11,128,736.

(51) Int. Cl.
*G06F 15/177* (2006.01)
*H04L 67/00* (2022.01)
(Continued)

(52) U.S. Cl.
CPC .......... *H04L 67/34* (2013.01); *H04L 41/0806* (2013.01); *H04L 67/01* (2022.05)

(58) Field of Classification Search
CPC ..... H04L 67/34; H04L 41/0806; H04L 67/01; G06F 3/04817; G06F 9/451; G06F 9/44505; G06F 3/0481
See application file for complete search history.

(56) References Cited

U.S. PATENT DOCUMENTS

2010/0161506 A1 6/2010 Bosenick et al.
2010/0229112 A1 9/2010 Ergan et al.
(Continued)

FOREIGN PATENT DOCUMENTS

WO WO 2019/146864 8/2019

OTHER PUBLICATIONS

International Search Report and Written Opinion in International Appln. No. PCT/US2020/038634, dated Oct. 5, 2020, 14 pages.
(Continued)

*Primary Examiner* — Phuoc H Nguyen
(74) *Attorney, Agent, or Firm* — Fish & Richardson P.C.

(57) ABSTRACT

A method includes selecting, by one or more servers, a digital component to be presented in an application executed at a client device; obtaining, by the one or more servers, attributes of the digital component, including at least one or more of a destination network location to which the digital component redirects users in response to interaction with the digital component and a reporting network location to which the interaction with the digital component is reported; after selecting the digital component and obtaining the attributes of the digital component, selecting, by the one or more servers and based on the obtained attributes, a config file that specifies a set of operations to be performed by the client device that presents the digital component; and transmitting, to the client device, a payload that includes information specifying the digital component to be presented in the application and the config file that, upon execution by the client device, causes the client device to perform the set of operations specified by the config file.

20 Claims, 6 Drawing Sheets

(51) Int. Cl.
*H04L 41/0806* (2022.01)
*H04L 67/01* (2022.01)

(56) References Cited

U.S. PATENT DOCUMENTS

| | | |
|---|---|---|
| 2014/0019228 A1 | 1/2014 | Aggarwal et al. |
| 2014/0304596 A1 | 10/2014 | Chandran et al. |
| 2015/0035823 A1 | 2/2015 | Arsan et al. |
| 2016/0036930 A1 | 2/2016 | Green et al. |
| 2016/0162277 A1 | 6/2016 | Fenzi et al. |
| 2018/0288180 A1 | 10/2018 | Toksoz et al. |
| 2019/0080260 A1 | 3/2019 | Acuna Agost et al. |
| 2020/0042928 A1 | 2/2020 | Kim et al. |
| 2020/0184009 A1* | 6/2020 | Wood ................ H04L 67/10 |
| 2021/0075886 A1 | 3/2021 | Wu et al. |
| 2021/0157619 A1* | 5/2021 | Singh ................ G06F 8/427 |
| 2021/0326018 A1* | 10/2021 | Bouda ............. G06F 3/04817 |
| 2021/0374264 A1* | 12/2021 | Todd ................ G06F 8/63 |

OTHER PUBLICATIONS

Office Action in Chinese Appln. No. 202080046480.9, dated Oct. 20, 2022, 13 pages (with English translation).

* cited by examiner

DYNAMICALLY CONFIGURABLE CLIENT APPLICATION ACTIVITY

CROSS-REFERENCE TO RELATED APPLICATION

This application is a continuation of U.S. application Ser. No. 16/564,298, filed Sep. 9, 2019, the contents of which are incorporated by reference herein.

FIELD

This application relates to dynamic configuration of actions performed by client applications, such as mobile applications or tablet applications.

BACKGROUND

Users of client devices (e.g., cellular phones, tablet devices, laptop computers) commonly use applications to interact with and access various types of content. For example, users can use applications to access e-mail, interact with social media, play games, obtain maps, online shop, and play media content. Applications running on a client device can display a variety of content, including interactive content, to users of mobile devices that are running the applications. These applications interact with one or more servers to report client side activity, such as user interaction with the applications.

SUMMARY

In general, one innovative aspect of the subject matter described in this specification can be embodied in methods that include the operations of selecting, by one or more servers, a digital component to be presented in an application executed at a client device; obtaining, by the one or more servers, attributes of the digital component, including at least one or more of a destination network location to which the digital component redirects users in response to interaction with the digital component and a reporting network location to which the interaction with the digital component is reported; after selecting the digital component and obtaining the attributes of the digital component, selecting, by the one or more servers and based on the obtained attributes, a config file that specifies a set of operations to be performed by the client device that presents the digital component; and transmitting, to the client device, a payload that includes information specifying the digital component to be presented in the application and the config file that, upon execution by the client device, causes the client device to perform the set of operations specified by the config file. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, the methods further comprise: receiving by a server at the reporting network location, a config reporting packet that (i) is generated by the client device in response to execution of the config file, and (ii) specifies the interaction with the digital component at the client device.

In some implementations, the methods further comprise: after transmitting the payload to the client device, selecting the digital component to be presented in the application a second time; selecting a different config file that specifies a different set of operations than the config file transmitted in the payload based on the different config file being mapped to the attributes of the digital component, instead of the config file, at the second time; and transmitting, to the client device, a different payload that includes the information specifying the digital component and the different config file, instead of the config file, based on the selection of the digital component while the attributes of the digital component are mapped to the different configuration file.

In some implementations, the different set of operations includes an additional operation that causes the client device to perform an action that the config file did not cause the client device to perform.

In some implementations, the additional operation causes the client device to collect visual element interaction data that the set of operations of the config file did not cause the client device to collect, wherein the visual element interaction data is collected in response to user interaction with visual elements of the application that are not part of the digital component presented in the application.

In some implementations, the set of operations comprises: a first operation that is performed by the client device in response to a first type of interaction with the digital component; and a second operation that is performed by the client device in response to a second type of interaction with the digital component.

In some implementations, the first operation causes the client device to report a presentation of the digital component in response to a first interaction with a first view of the digital component that is presented before interaction with the digital component within the application; and the second operation causes the client device to report a second interaction with a second view of the digital component that is presented after the first interaction with the first view of the digital component.

In some implementations, selecting a config file that specifies a set of operations to be performed by the client device that presents the digital component comprises: analyzing the obtained attributes to determine a particular format of the digital component; determining a version of the application that is being executed by the client device; and selecting, from among multiple different config files, a particular config file that is defined for the combination of the particular format of the digital component and the version of the application.

Generally, actions taken by an application in response to user interaction with components of the application (e.g., user interface components), which can be referred to as event reporting, are carried out by sending a URL or calling certain pre-defined application programming interfaces (API) inside the mobile application. For example, event reporting may be configured as a mapping of user actions to reporting events (e.g., data transmissions or other client device activity). However, in traditional systems, the actions taken by an application (or the client device), are generally hard-coded in the application itself, which makes it difficult to change the actions that a particular application takes in response to user interaction with the application, or components presented in the application (e.g., content presented in a slot of the application display). For example, changing the actions taken by an application has generally required the release of an updated version of the application in which the mapping of the user interactions to the actions taken by the application is updated. Releasing an updated version of the application requires significant testing, and can result in unintended errors once released on a broad scale. Further-more, even if an updated version of an application is released, users may not perform the update needed to implement the changes and/or their client device may be an older version that is not supported in the updated version of the application. Thus, even changing the hardcoding of the application itself may not be sufficient for changing the operation of the application once it has been installed on a client device.

The subject matter described in this specification may have one or more of the following advantages. The subject matter described in this specification can be implemented to allow for the introduction of new actions to be performed by the application and/or support for new content formats (e.g., one click, charge on external click, etc.) without substantially increasing the amount of logic required on the client side, and without requiring the release of an updated version of the application. For example, the techniques discussed in this document enable these changes to be made at a server that downloads a config file to a client device when a request from the application is received. In some implementations, the config is part of the response metadata rather than a file. It is referred to herein as a config file, but in all instances, it may either be a config file or part of the response metadata. As discussed in more detail below, the config file defines the actions taken by the application in response to specified user interactions with particular user interface elements, and causes the application to carry out the defined actions. Because the config file is generated at the server, and provided to each client device on demand, the activities defined in the config file can be changed as often as needed, or desired, and can be varied on a per-device or per-user basis, thereby providing more flexibility in controlling the application environment. As more content formats are introduced, embodiments of the subject matter described in this specification improve the ability of the client device to react to user interactions with the content formats, and improve the ability of the client device to provide feedback to the server, which is an improvement over current reporting framework.

By consolidating client instructions to a single config file, client-side event reporting can be unified, and complexity in the client device can be reduced. Reporting actions can be configured at serving time in the server to improve efficiency. The amount of lag time associated with client code changes reaching production can be reduced. Errors that can be encountered when updating a client application to a new version can be more easily and quickly identified and fixed because no need to wait for the user to download a new version of the application.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

In general, this document describes mechanisms for triggering client side activity responsive to a user's interaction with digital component in an application on a client device. In some implementations, the client device communicates with one or more servers in order to receive instructions specifying a set of one or more operations corresponding to the user's interaction with the digital component. In particular, a server may provide content for display on a client device, including data that causes a digital component to be displayed, and a config file associated with the digital component. When a user interacts with the digital component displayed in the application on the client device, the client device executes the config file, which causes particular actions to be performed by the client device, according to the config file. In particular, the config file may cause the application on the client device to transmit data to the server reporting the user interaction with the digital component to the server, and/or perform one or more other actions responsive to the user interaction. In turn, the server may perform a number of responsive actions, such as reporting the user interaction with another server. In this way, explicit instructions can be provided to the client device to specify actions to be performed as a result of user actions or interactions with digital components in an application running on the client device.

The use of a unified config file allows content providers to support different types of content formats, vary the actions performed by the client device responsive to interactions with the different types of content formats, and reduce lag time for format changes and/or client action changes to reach production. For example, by providing client devices with config files generated at the server rather than hardcoding such files at the client device, applications running on the client device need not be updated to address new content types because the server-generated config files can provide the applications with data needed to support the new content types. That is, hardcoded logic in the client device is often not flexible enough support new use cases, necessitating a change in logic in the application on the client device.

Reporting for each content format can be decomposed into a combination of base content actions (e.g., ping a URL, report a content-related event to a content provider, etc.). Described herein is a system where a combination of actions per user action is configured by proto on a content server.

Figure 1:
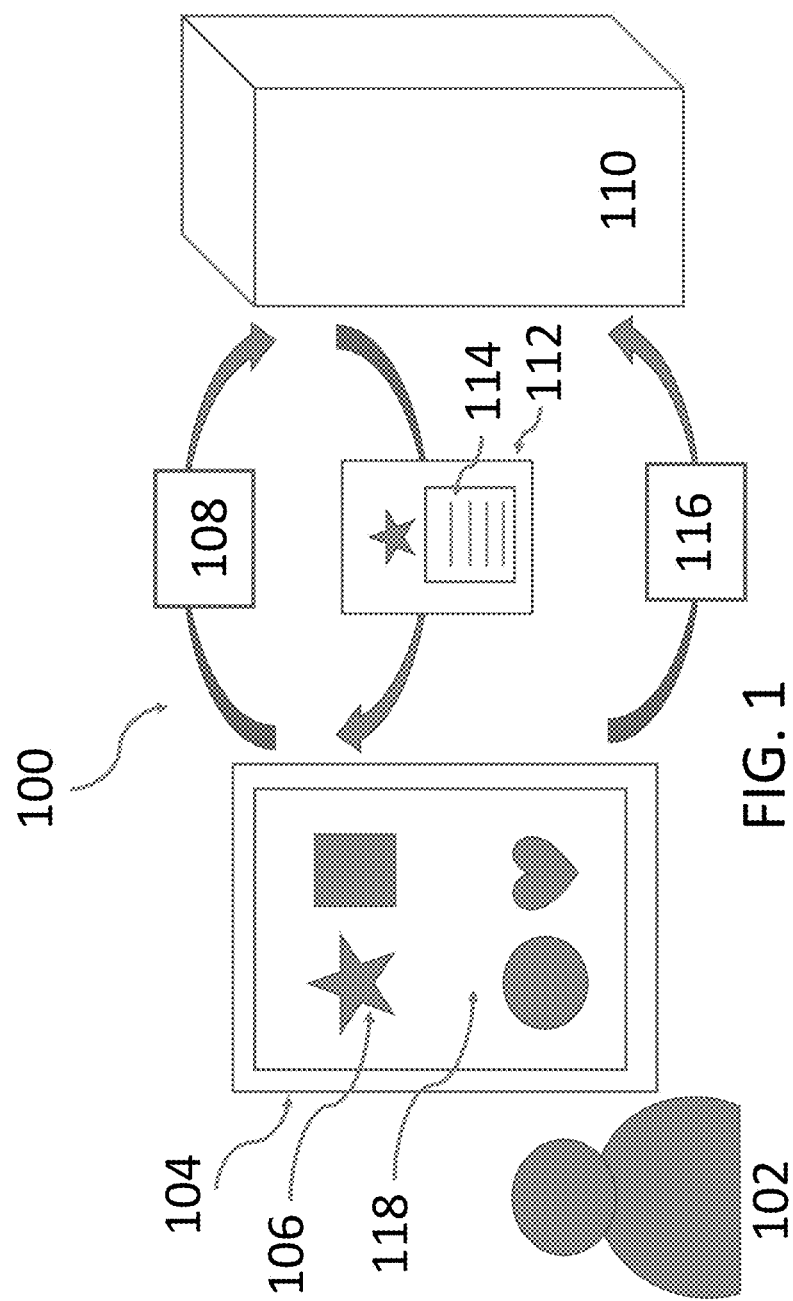
FIG. 1 is a conceptual diagram of a system for triggering client side activity responsive to a user's interaction with digital components on a mobile device FIG. 2 a block diagram of an example environment for triggering client side activity responsive to user interactions with digital components in applications.

FIG. 1 shows a conceptual diagram of a system 100 for triggering client side activity responsive to a user's interaction with digital components on a mobile device. FIG. 1 shows a user 102 of client device 104 using an application 118 running on the client device 104. A server 110 transmits data 112, also referred to as a payload, including a digital component (e.g., a star) or information that specifies the digital component and a config file 114 corresponding to the digital component. In some implementations, the server 110 provides the data 112 in response to a request 108 from the client device 104. The config file 114 includes data that, when executed by the client device 104, causes the client device 104 to perform a set of operations specified by the config file 114.

After the server provides the data 112 to the client device 104, the client device 104 displays content associated with the received data 112 on a display of the device 104, for example, in an application 118 running on the device 104. In FIG. 1, the client 104 is displaying a "star" digital component 106, which was provided by the server 110. When the user 102 interacts with the "star" digital component 106 on the client device 104, for example, by clicking or touching his or her finger to the "star" digital component 106, the application 118 sends a config reporting packet 116 to the server 110, where the packet 116 provides to the server an indication of the user interaction with the "star" digital component 106. The config reporting packet 116 may include, for example, data that reports a URL or calls an API that reports the URL.

In the example shown in FIG. 1, the application 118 running on the client device 104 shows a number of different digital components, in addition to the "star" 106, including a square, a circle, and a heart. Each of the digital components may be associated with different config files sent by the server 110, each of which include respective sets of operations associated with the particular digital component. For example, the "star" component 106 may be associated with causing a particular video to be provided and played on the client device. Alternatively, the components may cause one of many actions to be performed, such as opening a web site associated with a particular URL, reporting to a particular content provider that a user has interacted with a particular digital content, causing a particular image to be displayed on the client device, and the like. In some implementations, certain actions, such as opening a URL or installing an application 118 on the client device 104, can be independently supported by the client device 104. For other actions, the application 118 on the client device 104 provides an indication to the server 110, which facilitates implementation of those actions, including reporting actions.

In some implementations, the server 110 may receive a report of the user interaction 116 and further report the user interaction to another server (not shown). In some implementations, the application 118 on the client device 104 sends the report 116 to more than one server. One or more of the servers may then call an application programming interface (API) to record the user interaction.

In some implementations, the system allows for more granularity with which actions can be differentiated by adding additional action identifiers. For example, different action configurations may be provided for different links in html text. For instance, a JavaScript® bridge may be introduced to support the passing of additional data from the link to the client's user interface. This approach provides several advantages. For example, if the user's action is clicking on a URL, it avoids the necessity of logic in the server to parse the clicked URL to determine the appropriate client response for the clicked URL and instead allows the server to provide the appropriate client response on a per-URL basis. Additionally, it allows for logging of various types of user actions, including interactions with different types of digital components (e.g., a button displayed as an overlay on a video). Moreover, it can be used to support formats that previously required a native format. Native formats are also compatible with the configuration.

The table below shows example html code that provides links to a user:

| Before | After |
|---|---|
| <a href=tel:15551234567>Call Now</a> | <a href="javascript:triggerAction('CallNow')">Call Now</a> |
| <a href=http://example.com>Visit Site</a> | <a href="javascript:triggerAction('VisitSite')">Visit Site</a> |

In the examples at left, when a user clicks on a particular link, the application displaying the link may either cause the phone number to be dialed or causes the application to load a website associated with the particular URL, but both the logic to parse the URLs and determine the actions that should be performed and the actions themselves must be hardcoded in the application. However, in the examples at right, when a user clicks on a particular link, the client device invokes a number of actions provided in a config file associated with the particular link, including but not necessarily limited to invoking the native action (e.g., opening the URL, logging a visual element event, calling a phone number, logging an event). Any number of actions may be invoked by the config file, including recording statistics of impressions or clicks in an application, or charging an advertiser for either impressions or clicks. The config file is generated at the server-side rather than the client-side, and not hardcoded in the application, so the actions triggered in response to client-side interactions with a digital component can easily be adjusted without necessitating client-side software updates.

Figure 2:
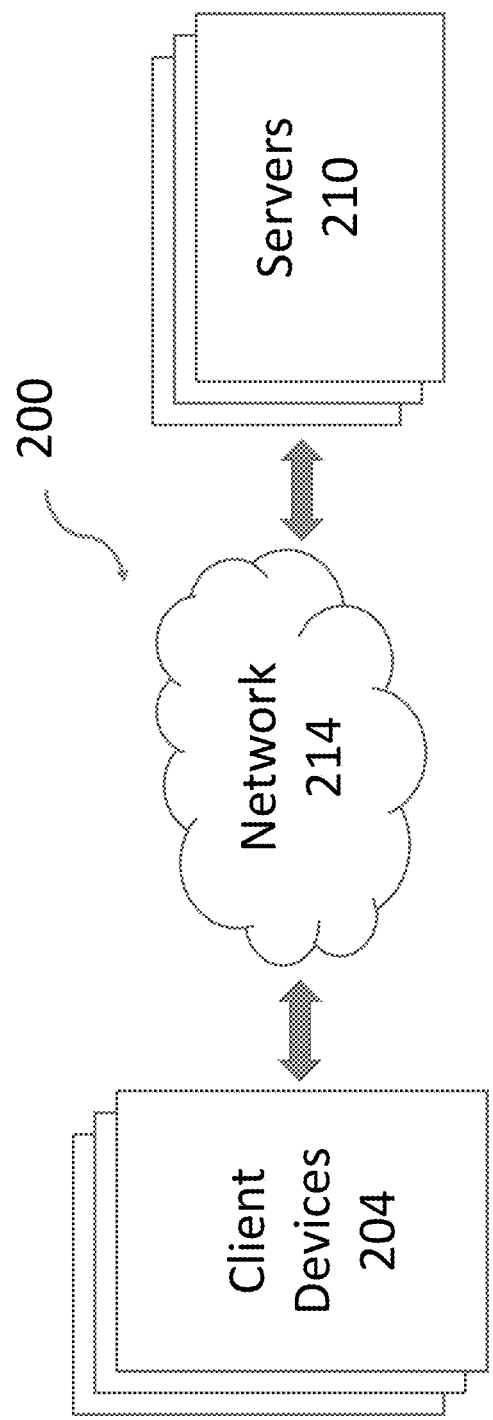
Figure 6:
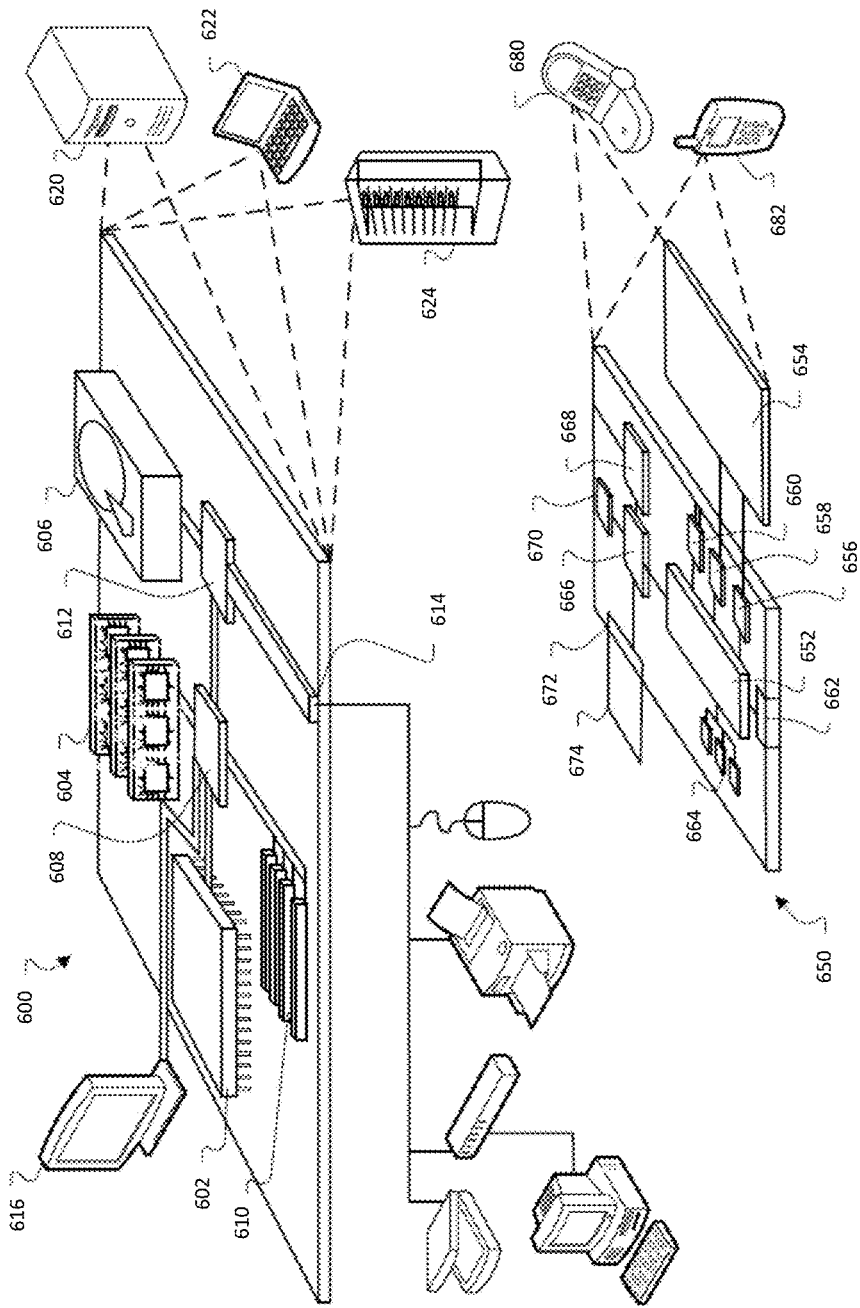
FIG. 6 shows an example of a computing device and a mobile computing device that can be used to implement the techniques described herein.

FIG. 2 shows block diagram of an example system 200 for triggering client side activity responsive to user interactions with digital components in applications. The system 200 includes one or more client devices 204, which can be mobile devices, such as smart phones, personal digital assistants, table devices, laptop devices, personal computers, and the like. The system 200 further includes one or more content servers 210 that communicate with and transmit content to the client devices 204. The client devices 204 and content servers 210 communicate in the system 200 over a network 214, such as a local area network (LAN), a wide area network (WAN), the Internet, or a combination thereof. The client device 204 or server 210 may be a computing device, as shown in FIG. 6 and discussed in more detail below.

Figure 3:
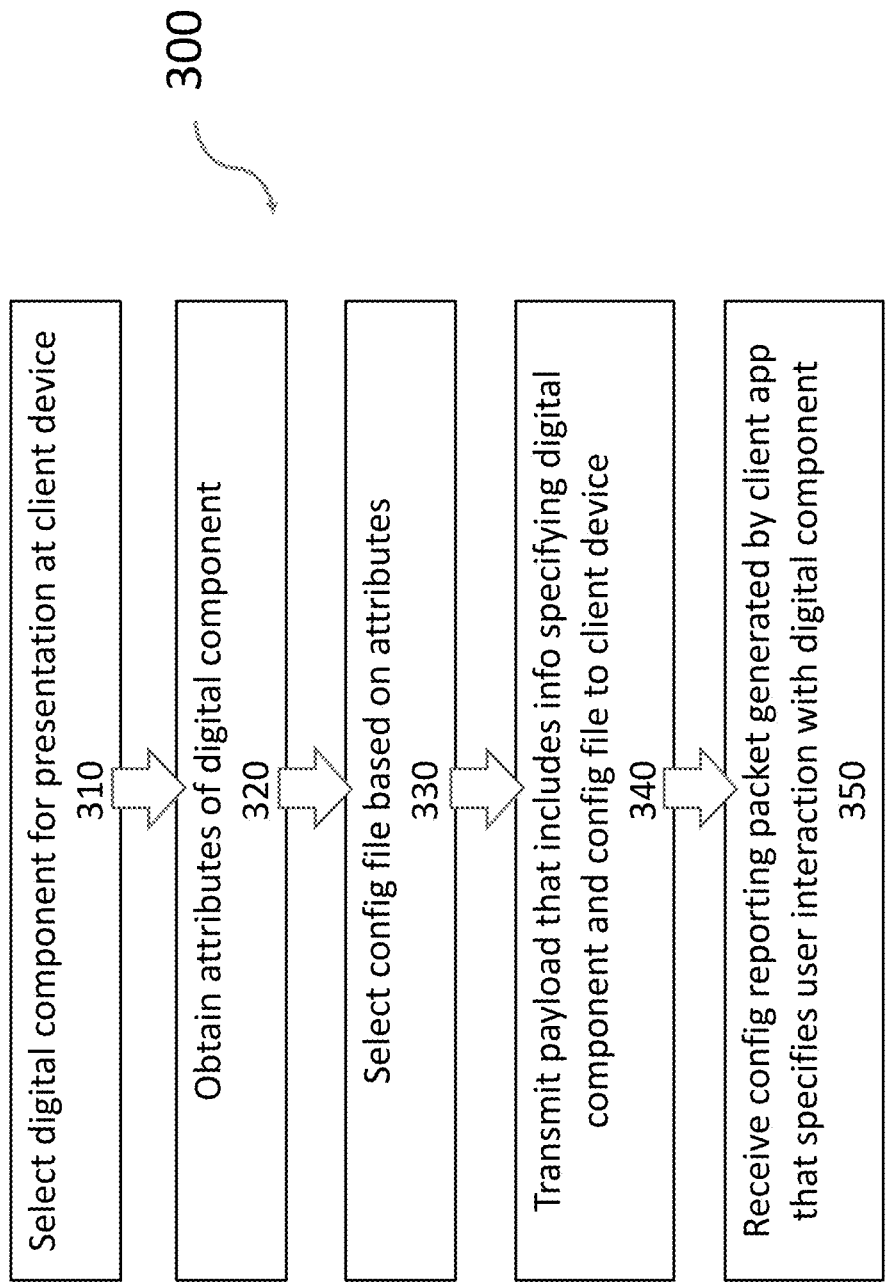
FIG. 3 is a flow chart of a method for providing a config file with a set of operations that trigger client side activity.

FIG. 3 shows a flow chart of a method 300 for providing a client device with a config file with a set of operations that trigger client side activity.

At 310, a server selects a digital component to be presented in a client application being executed at the client device. The server may select the digital component, for example, in response to a request for content from the client device. Digital components may be presented in different forms depending on a number of factors including a type of a client device on which the digital component will be presented, capabilities of the client device (e.g., calling capability, video chat capability, etc.), applications installed on the client device, an application in which the digital component will be presented, and/or a content type depicted by the digital component (e.g., text, image, audio, or video). Digital components may be transmitted to a client device in a push or pull manner, with push digital components being provided independent of an explicit request from the client device, and pull digital components being provided in response to an explicit request from the client device.

At 320, the server obtains attributes of the digital component, including at least one or more of a destination network location to which the digital component redirects users in response to interaction with the digital component and a reporting network location to which the interaction with the digital component is reported. The digital component may include, for example, text, video, audio, image data, or a combination thereof. The attributes can include a type of a client device on which the digital component will be presented, capabilities of the client device, applications installed on the client device, an application in which the digital component will be presented, and/or a content type depicted by the digital component.

At 330, after selecting the digital component and obtaining the attributes of the digital component, the server selects, based on the obtained attributes, a config file that specifies a set of operations to be performed by the client device that presents the digital component. In some implementations, the config file can specify that different operations be performed by the client device serially and/or in parallel responsive to user interaction with the digital component within the application. For example, different network calls initiated by the client device can be performed in parallel. In a specific example, a reporting server may be contacted while the client device is also being directed to the destination page linked to by the digital component. This approach reduces latency in systems and methods that use hardcoded sequential calls.

At 340, the server transmits a payload to the client device. The payload includes information specifying the digital component to be presented in the application and the config file. The config file includes data that, upon execution by the client device, causes the client device to perform the set of operations specified by the config file. In some implementations, the information specifying the digital component to be presented in the application may include, for example, data comprises the digital component itself (e.g., an image file). In some implementations, the information specifying the digital component to be presented in the application includes a pointer or a link to the digital component.

At 350, the server receives a config reporting packet that is generated by the client application running on the client device. In general, the config reporting packet is sent by the client application running on the client device in response a user interacting with the digital component and specifies the interaction with the digital component at the client device. The user interaction with the digital component may include, for example, a user clicking on the digital component or touching a finger to a touchscreen on the digital component.

In some implementations, the config file associated with (e.g., assigned to) a digital component may be changed at the server. When the config file that is assigned to the digital component changes, such that a different config file is assigned to the digital component, the server will select and transmit the different config file with the digital component in response to subsequent requests for content.

In these implementations, the method 300 can include further actions taken by the server. For example, after the server transmits the payload data including the config file that was previously assigned to the digital component, the server can select the digital component to be presented in the application a second time (e.g., responsive to a request from the client device). Upon selecting the digital component for the second time, the server can select the different config file, which specifies a different set of operations than the config file previously transmitted in the payload, based on the different config file being mapped to the attributes of the digital component (e.g., at the time of the request). That is, instead of selecting the config file, at the second time the digital component is being selected, the server selects the different config file based on the updated mapping of the different config file to the attributes of the digital component. The server then transmits, to the client device, a different payload that includes the information specifying the digital component and the different config file, instead of the config file, based on the selection of the digital component. The server will continue to select the different config file to be transmitted with the digital component while the attributes of the digital component are mapped to the different configuration file. The different set of operations may include one or more additional operations that cause the client device to perform an action that the config file did not cause the client device to perform. The different set of operations may also include fewer operations than the original config file. Thus, a server can dynamically adjust config files associated with digital components without requiring modifications on the client device.

In this way, different content formats may be presented by the server with config files that are modified or adapted to the particular content format. In some implementations, one or more additional servers may be used to support new features or data collection related to particular content formats. Indeed, one of the benefits of the use of the server-provided config files is the ability to dynamically generate or modify config files at the server to cater to new content types. Generating or modifying config files at the server, rather than at the client device, removes the need to rely on users to update applications at the client side.

In some implementations, the additional operation causes the application on the client device to collect visual element interaction data that the set of operations of the config file did not cause the application on the client device to collect. The visual element interaction data is collected in response to user interaction with visual elements of the application that are not part of the digital component presented in the application. For example, the collected visual interaction data may comprise data relating to general application UI interactions.

In some implementations, the set of operations specified by the config file comprises a first operation that is performed by the client device in response to a first type of interaction with the digital component; and a second operation that is performed by the client device in response to a second type of interaction with the digital component. For example, a user of a client device may first click a teaser view and then click an ad body in expanded form to navigate to a landing page. In this example, the first operation may be reporting the expansion of the ad, and the second operation may be reporting the opening of the landing page.

In some implementations, the first operation causes the application on the client device to report a presentation of the digital component in response to a first interaction with a first view of the digital component that is presented before interaction with the digital component within the application; and the second operation causes the application on the client device to report a second interaction with a second view of the digital component that is presented after the first interaction with the first view of the digital component. For example, a first view of the digital component may be a teaser view, and after a user clicks on the digital component in the teaser view, the digital component may be presented in a second view that is an expanded view.

In some implementations, selecting a config file that specifies a set of operations to be performed by the client device that presents the digital component comprises analyzing the obtained attributes to determine a particular format of the digital component; determining a version of the application that is being executed by the client device; and selecting, from among multiple different config files, a particular config file that is defined for the combination of the particular format of the digital component and the version of the application. The version of the application may be passed, for example, in a request for content from the client device to the server. The particular config file may comprise a mapping of content formats and application versions, or any other attributes to different config files.

Content Action Configuration

Content actions (e.g., digital component actions) may be the smallest unit of computation and represent functionality that cannot be decomposed further. The main actions are common actions used across all content formats. The example code below shows an AdAction proto that is the container for digital component actions that occur in the server layer. In the example, the configuration is built up using protobuf, though it can be provided in other formats such as XML or Json.

```
message AdAction {
    optional AdClientAction ad_client_action;
    optional AdStateAction ad_state_action;
    repeated AdReportingAction ad_reporting_action;
}
message AdClientAction {
    enum AdClientActionType {
        UNKNOWN;
        URL_NAVIGATION_AD_ACTION;
        PLAY_STORE_NAVIGITION_AD_ACTION;
    }
    optional AdClientActionType type;
    optional UrlNavigationAdAction url_navigation_ad_action;
    optional PlayStoreNavigationAdAction
        play_store_navigation_ad_action;
}
message AdStateAction {
    enum AdStateActionType {
        UNKNOWN;
        DISMISS;
        SHOWN;
        OPENED;
        SURVEY_SUBMITTED;
        STARRED;
        UNSTARRED;
        FORWARD;
        FORM_SUBMIT
    }
    optional AdStateActionType type;
}
message AdReportingAction {
    enum AdReportingActionType {
        UNKNOWN;
        HTTP_REQUEST_AD_ACTION;
        FORM_SUBMISSION_AD_ACTION;
        FRONTEND_AD_EVENT_AD_ACTION;
    }
    optional AdReportingActionType type;
    optional HttpRequestAdAction http_request_ad_action;
    optional FormSubmissionAdAction form_submission_ad_action;
    optional FrontendAdEventAdAction frontend_ad_event_ad_action;
}
```

Another proto specifies the launching of a browser on a client device. The example code below shows a UrlNavigationAdAction that specifies launching the browser:

```
message UrlNavigationAdAction {
    optional string url;
    optional CreativeConversionDelayOptions gm_ccd_options;
    message AsyncOptions {
        optional string landing_page_url;
        optional string async_tracking_url;
    }
    optional AsyncOptions async_options
}
message CreativeConversionDelayOptions {
    enum Action {
        OPENED;
        SHOWN;
    }
    optional Action duration_since_action;
}
```

One proto may be used to specify what application to open in an application store. The example code below shows a proto for PlayStoreNavigationAdAction, which specifies an application to open in the Play Store on the client device:

```
message PlayStoreNavigationAdAction {
    optional string package_name;
    optional string referrer;
    optional string google_referrer;
    optional bool enable_inline_install;
}
```

Additionally, many content operations require updating the state of a stored content in a content database, such as whether the content has been dismissed or the last time that the content was shown. This action abstracts content table operations. The example code below shows a proto for AdStateAction to update the state of a stored ad in an ads database:

```
message AdStateAction {
    enum AdStateActionType {
        DISMISS;
        SHOWN;
        OPENED;
        SURVEY_SUBMITTED;
        STARRED;
        UNSTARRED;
        FORWARD;
        FORM_SUBMIT
    }
    optional AdStateActionType type;
    optional string ad_server_id;
}
```

A content reporting action, such as an HTTP request content action, may be used to specify an HTTP GET request to a specified URL. The ClickServerResponse enum may be used to specify whether a response is expected and should be stored. The example code below shows a proto for HttpRequestAdAction:

```
message HttpRequestAdAction {
    optional string url;
    optional UrlParamConfig url_param_config;
    enum ClickServerResponseType {
        NONE;
        JSON;
```

```
        }
        optional ClickServerResponse click_server_response_type;
    }
    message UrlParamConfig {
        optional CreativeConversionDelayOptions
        creative_conversion_delay_options;
    }
```

Another content reporting action, such as an HTTP post request content action, specifies an HTTP POST request to a specified URL. The example code below shows a proto for FormSubmissionAdAction:

```
message FormSubmissionAdAction
    optional string url;
    enum FormSubmitFormat {
        UNKNOWN,
        PROTO, // Proto form format for click server form submission.
        URL_ENCODED, // Url encoded format for direct submission
to Google forms.
    }
    optional FormSubmitFormat format;
    optional string metadata;
}
```

A content provider event content action specifies a content event to report. The example code below shows a proto for ExampleContentProviderReportingConfig:

```
message ExampleContentProviderReportingConfig {
    optional
    ExampleContentProvider.ui.proto.AdEventRequest.AdEventType
    type;
    optional string ad_event_id;
    optional string obfuscated_data;
    optional ViewType view_type;
}
```

Content Action Triggering

Content actions may be triggered in different ways. For content event type triggering, user actions on the UI correspond to predefined content event types (e.g., pressing the star button triggers a STARRED content event). This option ties the content action config to a particular event type. Example code for ad event type triggering is shown below.

```
    message AdElementConfig {
        optional AdEventRequest . AdEventType event_type ;
        optional AdAction ad_action ;
    }
    message Ad {
        ...
        repeated AdElementConfig ad_element_config ;
        ...
    }
```

Additional content event types may be defined to distinguish between events that occur in both the thread list and conversation view.

When content action is triggered for each content item, the content action is configured per UI component and per user action. Most UI elements can be uniquely identified by their component ID. However, in the case of multiple elements of the same ID, an element_index may be added. Using a combination of ID, index, and user action, a config for a particular action can be defined. The example code below shows a proto for ContentElementConfig that may be used to map an ad action to its UI component and user action:

```
    message ContentElementConfig {
        optional int element_id ;
        optional int element_index ;
        optional logs . UserAction user_action ;
        optional ContentAction content_action ;
    }
    message Content {
        ...
        repeated ContentElementConfig content_element_config ;
        ...
    }
```

For content action triggered by UI component, the configured UI components are explicitly listed. The example code below shows a proto for ContentElementConfig where content action is triggered by a UI component:

```
    message ContentElementConfig {
        message ThreadListActionConfig {
            optional ContentAction dismiss;
            optional ContentAction star;
            optional ContentAction forward;
            optional ContentAction open;
            optional ContentAction view;
        }
        optional ThreadListActionConfig thread_list_action_config;
        message ConversationViewActionConfig {
            optional ContentAction dismiss;
            optional ContentAction star;
            optional ContentAction forward;
            optional ContentAction external_click;
        }
        optional ConversationViewActionConfig
        conversation_view_action_config;
    }
    message Content{
        ...
        optional ContentElementConfig Content_element_config;
        ...
    }
```

Storing Content Actions

Content actions may further be stored. In the API layer, content items are converted to their API interface. On instantiation, the content item config file may be converted to a map from, for example, a visual element ID, element index, or user action, to a content action.

Figure 4:
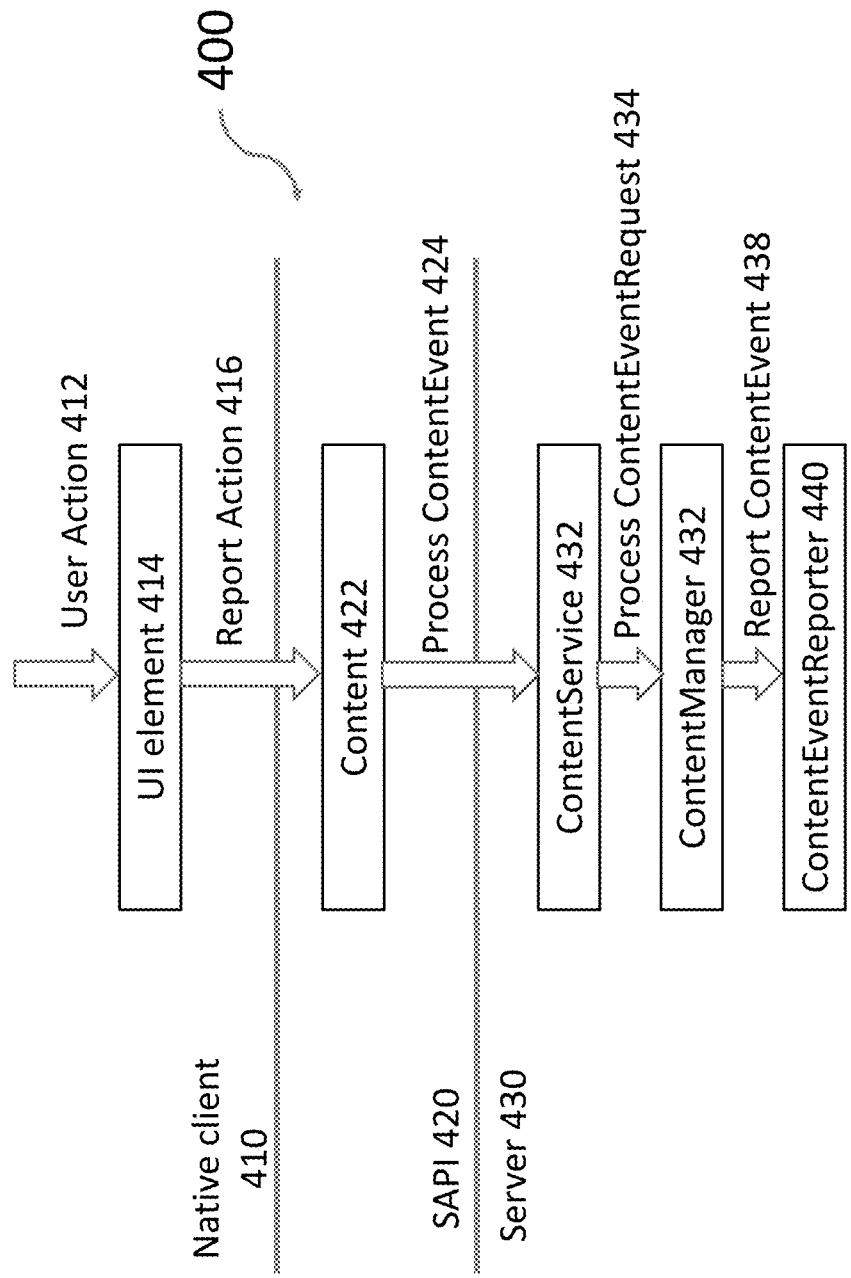
FIG. 4 is a flow chart of a first example process for triggering client side activity responsive to user interactions with digital components in applications.

FIG. 4 shows a flow chart of a first example process 400 for triggering client side activity responsive to user interactions with digital components in applications. At a native client 410, a user performs an action 412 on a user interface (UI) element 414. Upon user action 412, the relevant action listeners are called. The listener then calls the content reporting function in the application programming interface (API) layer 420 (e.g., pressing a star button calls the star( ) function) with a report action 416.

In the API layer 420, content 422 associated with the UI element 414 makes an asynchronous call at 424 to processContentEvent in ContentService 432 with a ContentEventRequest 434. The ContentEventRequest 434 contains the reporting type and information related to the action. The ContentService 432 function serves as the entry point to the service layer. The ContentEventRequest 434 is passed onto the ContentManager 436 to be processed. Different reporting functions are called by the Content Manager 436 based on the type of ContentEventRequest 434. A state update may also be made to the content table. The ContentEventReporter 440 performs the actual business logic for reporting each logic based on the function called.

Figure 5:
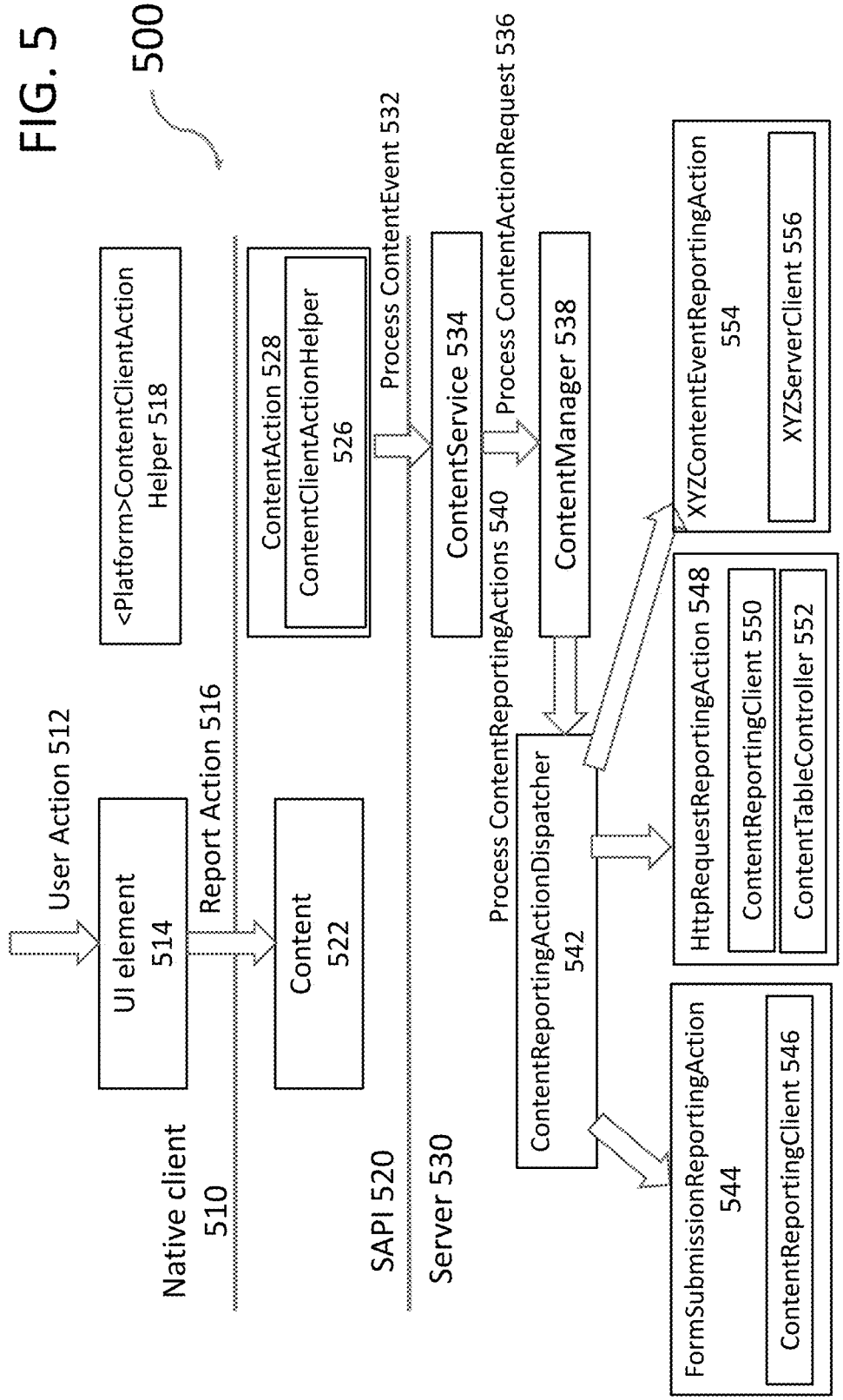
FIG. 5 is a flow chart of a second example process for triggering client side activity responsive to user interactions with digital components in applications.

FIG. 5 shows a flow chart of a second example process 500 for triggering client side activity responsive to user interactions with digital components in applications. At a native client 510, a user performs an action 512 on a user interface (UI) element 514. The action 512 may be, for example, a clicking action (e.g., a single or double click), hovering a cursor (e.g., with a mouse) over an element, touching an element on a touchscreen with a finger, or dragging or sliding an element (e.g., with a mouse or with a finger on a touchscreen). The element 514 may be, for example, a link, a media element (e.g., a picture, a sound clip, a video clip), a button (e.g., radio button), a toggle, an input field, a text field, a date/time picker, a dropdown list, a list box, a dropdown button, a checkbox, a card (i.e., module that contains different types of information), a carousel, a feed, a form, a hamburger menu, an icon, a modal, a notification, a sidebar, a tab bar, a tag, or any combination thereof.

The user action 512 on the UI element 514 causes the native client 510 to report the action at 516 to the API layer 520. On user action 512, this function is called to handle the action 512.

When the reporting action 516 occurs, the user interface of the native client 510 calls the API content item 522 to perform a lookup into a map for an action. If an action is found, a new API ContentAction 524 is instantiated.

The ContentAction API interface 528 helps to execute ContentActions 524. ContentClientActions are executed in the native client 510 using ContentClientActionHelper 518 and ContentClientAction Helper 526 in the API layer. The ContentClientActionHelper 518 is implemented for each platform to allow the API layer to have a platform-agnostic way to execute UI actions.

All non-UI content actions are aggregated and sent to the ContentService 534 in the server layer 530 in the ContentActionRequest at 532. The ContentActionRequest 536 is processed by the ContentManager 538. For reporting content actions, the ContentManager 538 calls the ContentReportingActionDispatcher 542 at 540 rather than the ContentEventReporter of FIG. 4. The ContentReportingActionDispatcher 542 calls the corresponding resolver (e.g., FormSubmissionReportingAction 544, HttpRequestReportingAction 548, XYZContentEventReportingAction 554) for the particular content reporting action. Reporting actions may include, for example, HTTP requests (GET, POST) to a URL, remote procedure call (RPC) calls to report content-related events to content servers, URL navigation, and application store navigation.

The corresponding resolver is implemented for each ContentReportingAction type. In some implementations, the HttpRequestReportingAction 548 contains a copy of the ContentTableController 552 to store any click server response.

Content Action Execution Detailed Design

A detailed design for content action execution is described below with respect to a content item that comprises an advertisement. The API content item handles the user action using, for example, the following code:

ListenableFuture<Boolean>handleContentAction (int visualElementId, int elementIndex, UserAction userAction, Map<String, Object>arguments);

Depending on the context, additional arguments may be passed to the map of arguments (e.g., pressing the submit form button in a formfill advertisement ads the form data as an argument to the map). The key to the map may be the argument name. This function performs a lookup to get the relevant content action. With the content action, the function calls the API AdAction interface to execute the AdAction. This function returns a ListenableFuture that completes when all ContentActions finish executing. A boolean indicates whether the execution was successful.

The API ContentAction interface (specifically, an AdAction interface) may be implemented using the following example code:

```
interface AdAction {
    ListenableFuture < Boolean > execute (Map < String, Object > arguments);
}
```

The API AdAction is instantiated with a AdtAction proto. On calling execute, the AdClientAction is executed first in the UI with the AdClientActionHelper. The AdStateAction and AdReportingActions are combined together into a request to AdService. Depending on the argument key, the argument is either added to the call to the AdClientActionHelper or to the request to AdService (e.g., form submit data added to the AdService call).

The AdClientActionHelper executes the UI AdActions. Each supported platform may have its own implementation. The following example code may be used to provide an AdClientActionHelper:

```
interface AdClientActionHelper {
    ListenableFuture < Boolean > launchUrl (AdBrowser params , AdItem ad);
    ListenableFuture < Boolean > launchInAppStore (AdItem ad);
}
```

A server RPC is used to execute content actions using, for example, the following code:
ListenableFuture<AdActionResponse>(AdActionRequest request);

The RPC in turn calls the server AdsManager to execute the AdActionRequest, as shown in the example code below:

```
message AdActionRequest {
    optional AdStateAction ad_state_action ;
    repeated AdReportingAction ad_reporting_action ;
    // Extra parameters for specific ad actions.
    optional FormSubmissionData form_submission_data ;
    optional ExternalClickedSource external_clicked_source ;
    optional AdSurveyType survey_type ;
    optional AdSurveyOption survey_answer;
}
message AdActionResponse {
    // For ad forwarding that creates a thread.
    optional string item_server_perm_id = 1 ;
}
```

The AdsManager may process AdActionRequests using the following example code:
ListenableFuture<AdActionResponse>processAdAction (AdActionRequest request);

The AdsManager may use the type of the AdEventRequest to control what ad state is updated. Alternatively, the AdsManager may use the type of the AdStateAction instead. If no AdStateAction is set, then the default action is to load the StoredAd for the reporting actions.

After the AdStateAction is executed, the AdReportingActionDispatcher is called with the updated StoredAd.

ListenableFuture<Void>processAdReportingAction
    (AdActionRequest request, StoredAd ad);

The dispatcher iterates through all AdReportingActions and executes them in parallel. The type of AdReportingAction is used to map to the correct ReportingAction.

The AdReportingAction interface may be provided using the following example code:

```
interface AdReportingAction {
    ListenableFuture < Void > report ( AdActionRequest request,
        StoredAd ad,
    AdReportingAction reportingAction);
}
```

The AdReportingAction interface is implemented for each reporting action type.

Content Format Specific Actions

Additional use cases are discussed below. For example, external click URL actions may be decomposed into reporting URL and landing page URL, which speeds up landing page loading and improves user experience. In general, the server may decompose a URL multiple times and ping in parallel to improve user experience.

In another use case, multiple URLs may be reported on a single event. Previously, when a user interacted with a particular URL element associated with multiple URLs, the application had to address each of the URLs in separate steps. For example, the client device required business logic to ping URL1, URL2, and URL3, and to further ping the API to report internal events. In some implementations, the server generates a single config file that addresses each of the separate URLs and the required ping action. In these flexible implementations, new URLs or internal events to be report can easily be added to the config file. Similarly, the order of the actions in the config file could easily be changed, and additional parameters could easily be appended. The entire config file is then sent to the client device.

The client device supports some generic actions, such as opening a URL or installing an application, that can be configured on a per-action basis by the server. The client device queries the API about what actions to perform by providing information that identifies the user action and receives the actions as a response.

JavaScript® API

An API may be provided on the client device to respond to user actions and to receive instructions from the server. In some implementations the API comprises a JavaScript® API. The following example describes a JavaScript® API that exists on a client device and supports passing information from the server to the application on the client device. In this example, the user actions relate to digital components that include a teaser and body (e.g., opening an ad body, submitting a leadgen form). A JavaScript® function is called in the code below from the body, which takes the name of the action that was triggered and invokes the associated config file:
    triggerAction(str)

Because the JavaScript® API is fixed for a particular client version, the server uses the same API for older clients to avoid issues with incompatibility. To address future changes, the API can be extended to take other (optional) parameters that may be helpful for other use cases:
    triggerAction(str, otherParameters)

In this way, the HTML code can be updated to pass new parameters, if available, and the otherParameters variable can be ignored for older clients. If used, otherParameters can contain metadata, including visual element metadata.

```
message NativeActionMetadata {
    // If present, will be used instead of the metadata in
    ad_action_config.
    optional BigTopVisualElementMetadata ve_metadata = 1 ;
    // Other fields to be added for additional use cases.
}
```

In certain cases (e.g., for leadgen content), it is desirable to log non-static metadata. For example, to report the number of characters entered in a field, a visual element event can be defined in the config:

```
ad_action_config {
    # Will be used when EnterName is called via triggerAction.
    ad_action_key {
        ad_action_type : URL_CLICKED
        event_source : CONVERSATION_VIEW
        element_id : "EnterName"
    }
    ad_native_actions {
        type : VISUAL_ELEMENT
        visual_element_action {
            ve_id : 62554 # AdFormfillField
        }
    }
}
```

Then from the body, logic is used to call the API, passing the visual element metadata:

```
<input type = "text"
    id = "name"
    onblur = "triggerAction ( 'EnterName' , enterNameMetadata ( )) " >
```

The following code calls a JavaScript® function that extracts the dynamic fields from the body and constructs the visual element metadata:

```
function enterNameVeMetadata ( ) {
    Var metadata = new NativeActionMetadata ( );
    var veMetadata = new BigTopVisualElementMetadata ( );
    var ad = new Ad ( );
    ad.setFieldName ( "Name" );
    ad.setFieldCharLength ( document . getElementById ( 'name'
    ).length );
    veMetadata.setAd ( ad );
    metadata.setVeMetadata ( veMetadata );
    return metadata.serializeBinary ( );
}
```

Alternative Protos

The following example describes various protos that can support various native actions on the client device. In the code below, the reporting config is passed to the client as an AdReportingActionConfig. Ads are synced as a separate server service, out of band with core mail sync and only stored in memory. To support native actions, the proto can be extended with an AdNativeAction containing the native UI actions associated with the config:

```
message AdNativeAction {
    enum AdNativeActionType {
        UNKNOWN ,
        URL_NAVIGATION ,
```

-continued

```
        PLAYSTORE_NAVIGATION ,
        VISUAL_ELEMENT
    }
    optional AdNativeActionType type ;
    optional UrlNavigationAction url_navigation_action ;
    optional PlayStoreNavigationAction play_store_navigation_action ;
    optional VisualElementAction visual_element_action ;
}
message UrlNavigationAction {
    // If absent, use the click url from AdItem.
    optional string url ;
    optional bool append_gm_ccd ;
    optional bool enable_shadow_async_click_tracking ;
}
message PlayStoreNavigationAction {
    optional string package_name ;
    optional string referrer ;
    optional string google_referrer ;
    optional bool enable_inline_install ;
}
message VisualElementAction {
    optional int32 ve_id ;
    optional bool root_page ;
    optional bytes metadata ; // Optional metadata to include in the VE
    event.
}
message AdReportingActionConfig ( possibly renamed to AdActionConfig
) {
    // The user action associated with the reporting actions.
    optional AdActionKey ad_action_key = 1 ;
    // The reporting actions to for the user action.
    repeated AdReportingAction ad_reporting_actions = 2 ;
// The native actions for the user action.
    repeated AdNativeAction ad_native_actions = 3 ;
}
```

Actions are keyed by AdActionKey, which is a comination of AdActionType and EventSource. For identifying the ad native action from the body, UI actions are mapped to items in the config. AdActionKey may be extended to take an ID field that can be passed from the client device:

```
message AdActionKey {
    // The type of user action.
    optional frontend.ads.proto.AdActionType ad_action_type = 1 ;
    enum EventSource {
        UNKNOWN = 0 ;
        THREAD_LIST = 1 ;
        CONVERSATION_VIEW = 2 ;
    }
    // The source of the user action.
    optional EventSource event_source = 2 ;
    // The id to use for actions from the body.
    optional string element_id = 3 ;
}
```

In these implementations, either ad_action_type or event_source is set, and element_id is optionally set (e.g., when ad_action_type and/or event_source is not enough to identify a user action). If ad_action_type and event_source are set, the AdReportingActionConfig is used when that event occurs. If element_id is set, the AdReportingActionConfig is used when that element_id is passed to triggerEvent( ) from the body.

API/Server Configuration

The following example describes methods for reporting an action given the element id on Ad, using the reporting config:

ListenableFuture<Void>clickedFrom Body (String elementId);

This calls AdsServiceServer.processAdEvent( )→AdsManagerImpl.processAdEventRequest( ) with AdEventRequest.EventType=URL_CLICKED and EventSource=CONVERSATION VIEW. AdsManagerImpl.urlClicked( ) thens call AdsReporterImpl.report( ), which looks up the reporting config.

A field is added to AdEventRequest to identify the id passed to API, which is set in Ad.clickedFromBody( ).

optional string elementId;

A method for fetching the native actions given the id on the API Ad object is also provided:

ListenableFuture<ImmutableList<AdNativeAction>>
   getNativeActions (String elementId);

Alternatively, clickedFromBody may return the list of native actions to be performed:

ListenableFuture<ImmutableList<AdNativeAction>>
   clickedFromBody (String elementId);

However, this requires the client to wait for the reporting to happen before performing the native actions, whereas in the previous example they are performed in parallel. Separating it into two API calls means the two can continue to happen in parallel.

This method returns a wrapper for the proto AdNativeAction that handles the URL parameterization:

```
interface AdNativeAction {
    AdNativeActionType getType ( );
    UrlNavigationAction getUrlNavigationAction ( );
    PlayStoreNavigationAction getPlayStoreNavigationAction ( );
    VisualElementAction getVisualElementAction ( );
}
interface UrlNavigationAction {
    // If async is enabled, the advertiser's landing page to be opened in
    the
    // browser.
    String getLandingPageUrl ( );
    // If async is enabled, the tracking url to be pinged w/ Leapfrog v2
    API,for
    // reporting a click in parallel to opening advertiser's landing page.
    String getTrackingUrl ( );
    // If async is disabled, the parameterized ad url to be opened in the
    browser.
    String getParameterizedUrl ( );
}
interface PlayStoreNavigationAction {
    String getParameterizedPlayStoreUrl ( );
    boolean getEnableInlineInstall ( );
}
interface VisualElementAction {
    int getId ( );
    boolean isRootPage ( );
    byte [ ] getMetadata ( ); // If not empty, parsed to a proto in the client
to be sent with the VE event.
}
```

For URL navigation, getNativeActions calls AdsServiceServer.getAdTransientState( )→AdsManagerImpl.getAdTransientState( ).

AdsManagerImpl.getAdTransientState( ) performs the parameterization logic and returns the parameterized url in a proto similar to the above interface (from which the interface will read):

```
message ResolvedAdNativeAction {
    optional AdNativeActionType type ;
    optional ResolvedUrlNavigationAction url_navigation_action ;
    optional ResolvedPlayStoreNavirugationAction
    play_store_navigation_action ;
    optional ResolvedVisualElementAction visual_element_action ;
}
message ResolvedUrlNavigationAction {
    optional string landing_page_url ;
    optional string tracking_url ;
```

```
    optional string parameterized_url ;
}
message ResolvedPlayStoreNavigationAction {
    optional string parameterized_play_store_url ;
    optional bool enable_inline_install ;
}
message ResolvedVisualElementAction {
    optional int32 ve_id ;
    optional bool root_page ;
    optional bytes metadata ;
}
message GetAdTransientStateResponse {
    // ...
    repeated ResolvedAdNativeAction ad_native_action ;
}
```

Client UI Configuration

In order to use the native reporting, a JavaScript® interface is introduced in the webview that the client can use to invoke the native action and associated reporting. An example implementation is shown below:

```
class AdActionJsBridge {
    private Ad ad ;
    void triggerAction ( String id , NativeActionMetadata
nativeActionMetadata ) {
        for ( AdNativeAction nativeAction : ad.getNativeActions( )) {
            switch ( nativeAction.type( )) {
                case URL_NAVIGATION :
                    // Open url, passing nativeActionMetadata if
needed.
                case PLAYSTORE_NAVIGATION :
                    // Open play store, passing
nativeActionMetadata if needed.
                case VISUAL_ELEMENT :
                    // Log VE event, passing nativeActionMetadata
if needed.
            }
        }
        ad.reportClickedFromBody(id);
    }
}
```

Visual Element Events

When the native action is a visual element event, the client needs to transform the data to a visual element event in the client, parsing the metadata bytes into the appropriate proto.

In some implementations, a tag NATIVE_ACTION may be used and populated with client metadata. In some implementations, an enum for NativeAction is used in the proto, and that enum is translated in the client to VisualElementTags. In some implementations, a single bytes field in the visual elements event is copied from the client directly, avoiding concerns with unknown fields. For example, in BigTopVisualElementMetdata, a field can be added shown below, to be populated in NativeActionAdVisualElement:

optional/*NativeAction*/bytes native_action;

In the visual element pipeline (createAdLandingPage), the bytes are parsed into the proto and added to the AdLandingPageEvent.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver. In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
    selecting, by one or more servers, a digital component to be presented in an application executed at a client device;
    obtaining, by the one or more servers, attributes of the digital component, including at least one or more of a destination network location to which the digital component redirects users in response to interaction with the digital component and a reporting network location to which the interaction with the digital component is reported;
    selecting, by the one or more servers and based on the obtained attributes, a config file that specifies a set of operations to be performed by the client device that presents the digital component, wherein selecting the config file comprises:
        determining a particular format of the digital component based on the obtained attributes,
        determining a version of the application that is being executed by the client device, and
        selecting, from among multiple different config files, a particular config file that is defined for the combination of the particular format of the digital component and the version of the application; and
    transmitting, to the client device, a payload that includes information specifying the digital component to be presented in the application and the config file that, upon execution by the client device, causes the client device to perform the set of operations specified by the config file.

2. The method of claim 1, wherein the config file records statistics of impressions or clicks in an application.

3. The method of claim 2, wherein the config file causes an entity to be charged for the impressions or clicks in the application.

4. The method of claim 1, further comprising:
    receiving a config reporting packet that (i) is generated by the client device in response to execution of the config file, and (ii) specifies the interaction with the digital component at the client device.

5. The method of claim 1, further comprising:
    after transmitting the payload to the client device, selecting the digital component to be presented in the application a second time;
    selecting a different config file that specifies a different set of operations than the config file transmitted in the payload based on the different config file being mapped to the attributes of the digital component, instead of the config file, at the second time; and
    transmitting, to the client device, a different payload that includes the information specifying the digital component and the different config file, instead of the config file, based on the selection of the digital component while the attributes of the digital component are mapped to the different configuration file.

6. The method of claim 5, wherein the different set of operations includes an additional operation that causes the client device to perform an action that the config file did not cause the client device to perform.

7. The method of claim 6, wherein the additional operation causes the client device to collect visual element interaction data that the set of operations of the config file did not cause the client device to collect, wherein the visual element interaction data is collected in response to user interaction with visual elements of the application that are not part of the digital component presented in the application.

8. The method of claim 1, wherein the set of operations comprises:
a first operation that is performed by the client device in response to a first type of interaction with the digital component; and
a second operation that is performed by the client device in response to a second type of interaction with the digital component.

9. The method of claim 8, wherein:
the first operation causes the client device to report a presentation of the digital component in response to a first interaction with a first view of the digital component that is presented before interaction with the digital component within the application; and
the second operation causes the client device to report a second interaction with a second view of the digital component that is presented after the first interaction with the first view of the digital component.

10. A system, comprising:
one or more memory devices storing instructions; and
one or more data processing apparatus that are configured to interact with the one or more memory devices, and upon execution of the instructions, perform operations including:
selecting a digital component to be presented in an application executed at a client device;
obtaining attributes of the digital component, including at least one or more of a destination network location to which the digital component redirects users in response to interaction with the digital component and a reporting network location to which the interaction with the digital component is reported;
selecting, by the one or more servers and based on the obtained attributes, a config file that specifies a set of operations to be performed by the client device that presents the digital component, wherein selecting the config file comprises:
determining a particular format of the digital component based on the obtained attributes,
determining a version of the application that is being executed by the client device, and
selecting, from among multiple different config files, a particular config file that is defined for the combination of the particular format of the digital component and the version of the application; and
transmitting, to the client device, a payload that includes information specifying the digital component to be presented in the application and the config file that, upon execution by the client device, causes the client device to perform the set of operations specified by the config file.

11. The system of claim 1, wherein the config file records statistics of impressions or clicks in an application.

12. The system of claim 2, wherein the config file causes an entity to be charged for the impressions or clicks in the application.

13. The system of claim 10, wherein the one or more data processing apparatus that are configured to interact with the one or more memory devices, and upon execution of the instructions, perform operations, further comprising:
receiving at the reporting network location a config reporting packet that (i) is generated by the client device in response to execution of the config file, and (ii) specifies the interaction with the digital component at the client device.

14. The system of claim 10, wherein the one or more data processing apparatus that are configured to interact with the one or more memory devices, and upon execution of the instructions, perform operations, further comprising:
after transmitting the payload to the client device, selecting the digital component to be presented in the application a second time;
selecting a different config file that specifies a different set of operations than the config file transmitted in the payload based on the different config file being mapped to the attributes of the digital component, instead of the config file, at the second time; and
transmitting, to the client device, a different payload that includes the information specifying the digital component and the different config file, instead of the config file, based on the selection of the digital component while the attributes of the digital component are mapped to the different configuration file.

15. The system of claim 14, wherein the different set of operations includes an additional operation that causes the client device to perform an action that the config file did not cause the client device to perform.

16. The system of claim 15, wherein the additional operation causes the client device to collect visual element interaction data that the set of operations of the config file did not cause the client device to collect, wherein the visual element interaction data is collected in response to user interaction with visual elements of the application that are not part of the digital component presented in the application.

17. The system of claim 10, wherein the set of operations comprises:
a first operation that is performed by the client device in response to a first type of interaction with the digital component; and
a second operation that is performed by the client device in response to a second type of interaction with the digital component.

18. The system of claim 17, wherein:
the first operation causes the client device to report a presentation of the digital component in response to a first interaction with a first view of the digital component that is presented before interaction with the digital component within the application; and
the second operation causes the client device to report a second interaction with a second view of the digital component that is presented after the first interaction with the first view of the digital component.

19. A non-transitory computer readable medium storing instructions that, when executed by one or more data processing apparatus, cause the one or more data processing apparatus to perform operations comprising:
selecting a digital component to be presented in an application executed at a client device;
obtaining attributes of the digital component, including at least one or more of a destination network location to which the digital component redirects users in response to interaction with the digital component and a reporting network location to which the interaction with the digital component is reported;
selecting, by the one or more servers and based on the obtained attributes, a config file that specifies a set of operations to be performed by the client device that presents the digital component, wherein selecting the config file comprises:
- determining a particular format of the digital component based on the obtained attributes,
- determining a version of the application that is being executed by the client device, and
- selecting, from among multiple different config files, a particular config file that is defined for the combination of the particular format of the digital component and the version of the application; and transmitting, to the client device, a payload that includes information specifying the digital component to be presented in the application and the config file that, upon execution by the client device, causes the client device to perform the set of operations specified by the config file.

20. The non-transitory computer readable medium of claim 19, wherein the instructions, when executed by one or more data processing apparatus, cause the one or more data processing apparatus to perform operations comprising:
- receiving at the reporting network location, a config reporting packet that (i) is generated by the client device in response to execution of the config file, and (ii) specifies the interaction with the digital component at the client device.

* * * * *